United States Patent [19]

Iles et al.

[11] Patent Number: 5,574,894
[45] Date of Patent: Nov. 12, 1996

[54] INTEGRATED CIRCUIT DATA PROCESSOR WHICH PROVIDES EXTERNAL SENSIBILITY OF INTERNAL SIGNALS DURING RESET

[75] Inventors: Alexander L. Iles; Joseph Jelemensky; Oded Yishay, all of Austin, Tex.

[73] Assignee: Motorola, Inc., Schaumburg, Ill.

[21] Appl. No.: 333,658

[22] Filed: Nov. 3, 1994

[51] Int. Cl.[6] .................................................. G06F 1/04
[52] U.S. Cl. ................................................................ 395/555
[58] Field of Search .............................................. 395/550

[56] References Cited

U.S. PATENT DOCUMENTS

| | | | |
|---|---|---|---|
| 4,385,349 | 5/1983 | Ashford et al. | 364/DIG. 2 |
| 4,432,049 | 2/1984 | Shaw et al. | 364/200 |
| 4,988,901 | 1/1991 | Kamuro et al. | 307/518 |
| 5,086,237 | 2/1992 | Matsumoto | 307/273 |
| 5,095,287 | 3/1992 | Irwin et al. | 331/1 A |
| 5,122,678 | 6/1992 | Takeyama | 307/269 |
| 5,126,594 | 6/1992 | Shaik et al. | 307/443 |
| 5,133,064 | 7/1992 | Hotta et al. | 395/550 |
| 5,155,451 | 10/1992 | Gladden et al. | 331/1 A |
| 5,191,239 | 3/1993 | Rogers | 307/445 |
| 5,323,066 | 6/1994 | Feddeler et al. | 307/272.3 |

*Primary Examiner*—Thomas M. Heckler
*Attorney, Agent, or Firm*—Elizabeth A. Apperley

[57] ABSTRACT

An integrated circuit terminal of a data processing system (10) is used to communicate multiplexed signals with an external device. During a reset operation in which a reset signal is asserted, a desired internal clock signal is driven to the integrated circuit terminal such that an emulation system (52) may use the internal clock signal to synchronize an emulation operation. After the reset signal is negated, the emulation system synthesizes the internal clock signal for use during emulation. External visibility of a write operation to a register which controls pertinent signal parameters is provided via other integrated circuit terminals when the data processor operates in an emulation mode. The external visibility allows the development system to make similar changes to corresponding signal parameters therein. Therefore, the development system is able to accurately synchronize an emulation operation even when signal parameters are modified during operation.

22 Claims, 10 Drawing Sheets

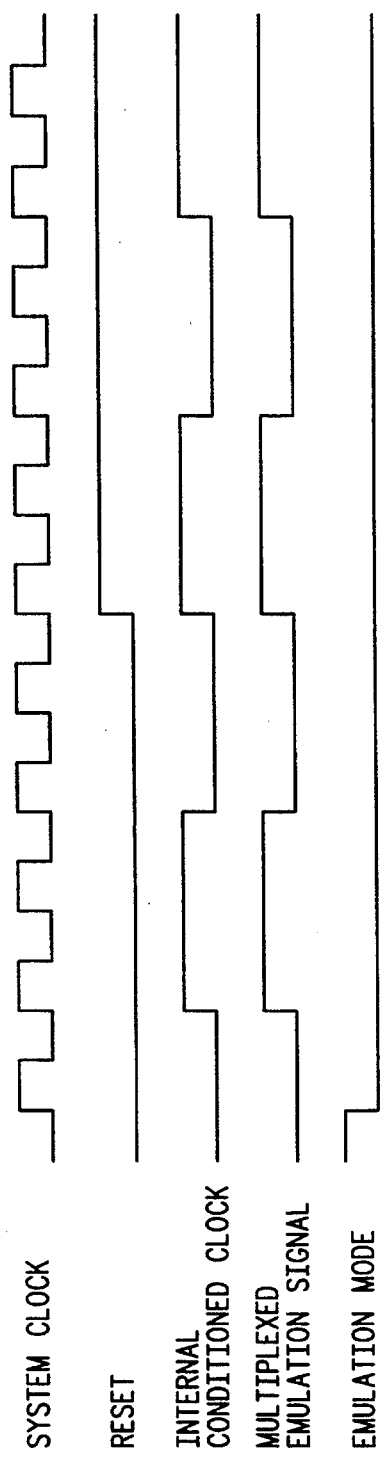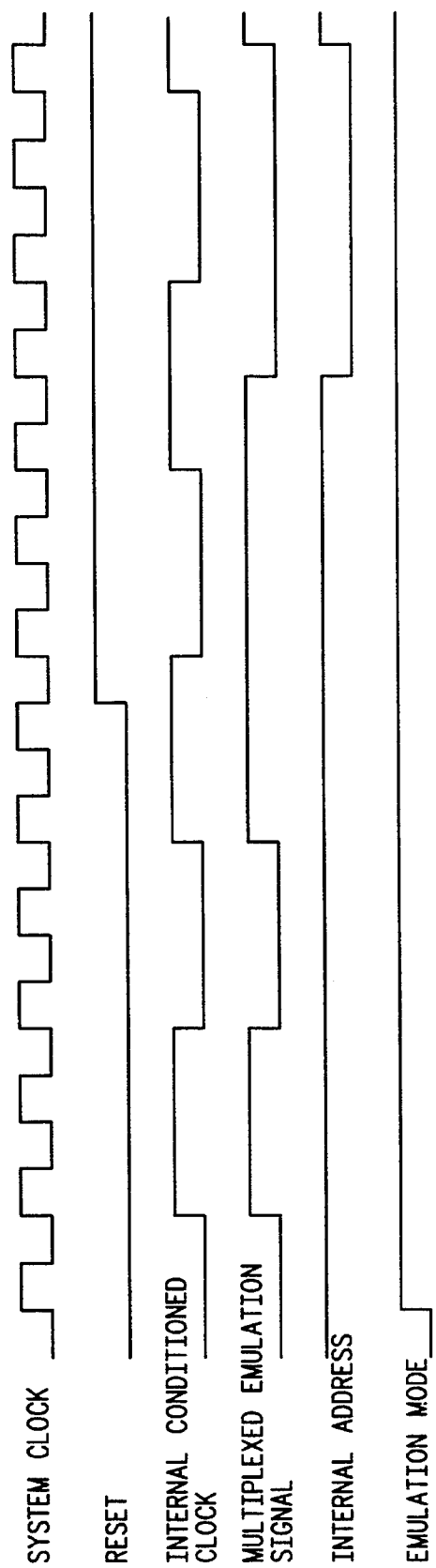

INTEGRATED CIRCUIT DATA PROCESSOR WHICH PROVIDES EXTERNAL SENSIBILITY OF INTERNAL SIGNALS DURING RESET

FIELD OF THE INVENTION

The present invention relates, in general, to integrated circuit data processors. More particularly, the invention relates to integrated circuit data processors that are capable of providing, while the processor is being reset, output signals corresponding to internally generated signals that would not otherwise be externally sensible.

BACKGROUND OF THE INVENTION

Integrated circuit data processors have become increasingly complex and have incorporated as internal components more functions previously implemented external to the integrated circuit. While the technology available to manufacture packages for integrated circuits has advanced to provide an increasing number of possible external terminals, or pins, it remains true that pin count affects the price of a semiconductor device as well as available integrated circuit packages. Furthermore, available technologies for the assembly of printed circuit boards is relatively expensive for high pin-count packages. Physical size of the package can also be an issue. These factors have resulted in highly complex data processors being contained in integrated circuit packages with a relatively small number of pins.

One well known method of reducing the number of required pins is to assign multiple functions to a single pin. The particular function assigned to a particular pin at any one moment is then determined by software, hardware or some combination thereof. Certain kinds of integrated circuit data processors, often referred to as microcontrollers, often are capable of operating in multiple modes, with certain pins having different functions in different modes of operation. A common example is a microcontroller operable either in a so-called "single chip mode" or in a so-called "expanded mode". In the expanded mode, certain of the pins of the integrated circuit package are used to provide the address, data and control connections required to connect the microcontroller to an external bus. In this mode, the microcontroller may access memory and other peripheral devices which can be accessed only by means of a bus. In the single chip mode, those pins are used for other input/output (I/O) functions such as for timing functions, parallel I/O, serial communication and the like. The microprocessor uses internal memory storage and peripherals during single chip mode.

The assignment of multiple functions to pins of an integrated circuit data processor also poses problems for the designers of development tools. Development tools are the hardware and software systems used by developers of an integrated circuit data processor application to create their own products. Development systems must typically perform several roles. The development system should provide as much information as possible regarding the internal state of the integrated circuit data processor, in order to assist in identifying the source of errors and characterization of operating conditions. They must permit the software being developed to reside in memory external to the integrated circuit even though that code may ultimately reside in non-volatile memory internal to the microprocessor. Development systems must also duplicate as precisely as possible the functionality of the integrated circuit as it may ultimately be used in production volumes. For example, a development system intended to permit the development of products which will use a microcontroller in single chip mode must usually use that same microcontroller, or a very similar one, in an expanded mode and must include all logic required to replace, or emulate, all pin functions available in single chip mode but not available in expanded mode.

A particular challenge of many development systems involves the provision of a clock signal reflecting an internal clock from the microcontroller to the emulation system when the clock signal is not provided on a integrated circuit pin which communicates multiplexed data for an alternate function required by the development system. In such situations, external circuitry within the emulation system may be developed to synthesize the clock signal and to allow the remaining signal which was part of the multiplexed data to be output on the pin without interference. While external synthesis of the clock signal is an appropriate solution to the problem, there must be a mechanism which synchronizes the synthesized signal generated by the emulation system with the actual signal used by the microcontroller. The synchronization step is especially problematic for signals which are not normally made available to external devices. In addition to the challenge of synchronizing the synthesized signal, designers of development systems are also faced with the possibility that the characteristic of the signal within the microcontroller may be modified. If the modification is not visible and the microcontroller does not provide the signal externally because the integrated circuit pin is required for an alternate function required by the development system, a faithful external reproduction by the emulation system may not be possible.

Accordingly, there is a need for integrated circuit data processors which provide access to internally generated signals that would not otherwise be externally visible. This need is especially illustrated when the integrated circuit data processors are emulated by development systems which must accurately simulate such internally generated signals at all times.

SUMMARY OF THE INVENTION

The previously mentioned needs are fulfilled with the present invention. Accordingly, there is provided, in a first form, a data processing system. The data processing system includes a bus interface circuit for communicating reset signal and a system clock circuit for communicating a system clock signal. A simulation clock generator is connected to the system clock circuit for receiving the system clock signal. The simulation clock generator provides an internal conditioned clock signal in response to the system clock signal. A mode control circuit determines a mode of operation of the data processing system. The mode control circuit provides a mode signal in a first logic state when the data processing system is operating in a first mode of operation and provides the mode signal in a second logic state when the data processing system is operating in a second mode of operation. A bus control circuit provides a first information value when the data processing system is in the first mode of operation and provides the internal conditioned clock signal when the data processing system is in the second mode of operation. The bus control circuit is connected to the bus interface circuit for receiving the reset signal, connected to the mode control circuit for receiving the mode control signal, and connected to the simulation clock generator for receiving the internal conditioned clock signal.

These and other features, and advantages, will be more clearly understood from the following detailed description taken in conjunction with the accompanying drawings. It is important to note the drawings are not intended to represent the only form of the invention.

BRIEF DESCRIPTION OF THE DRAWINGS

FIG. 7 illustrates in timing diagram form a plurality of signals generated by the development system during a normal mode of operation;

FIG. 8 illustrates a timing diagram form a plurality of signals generated by the development system during an emulation mode of operation;

DETAILED DESCRIPTION OF A PREFERRED EMBODIMENT

Figure 1:
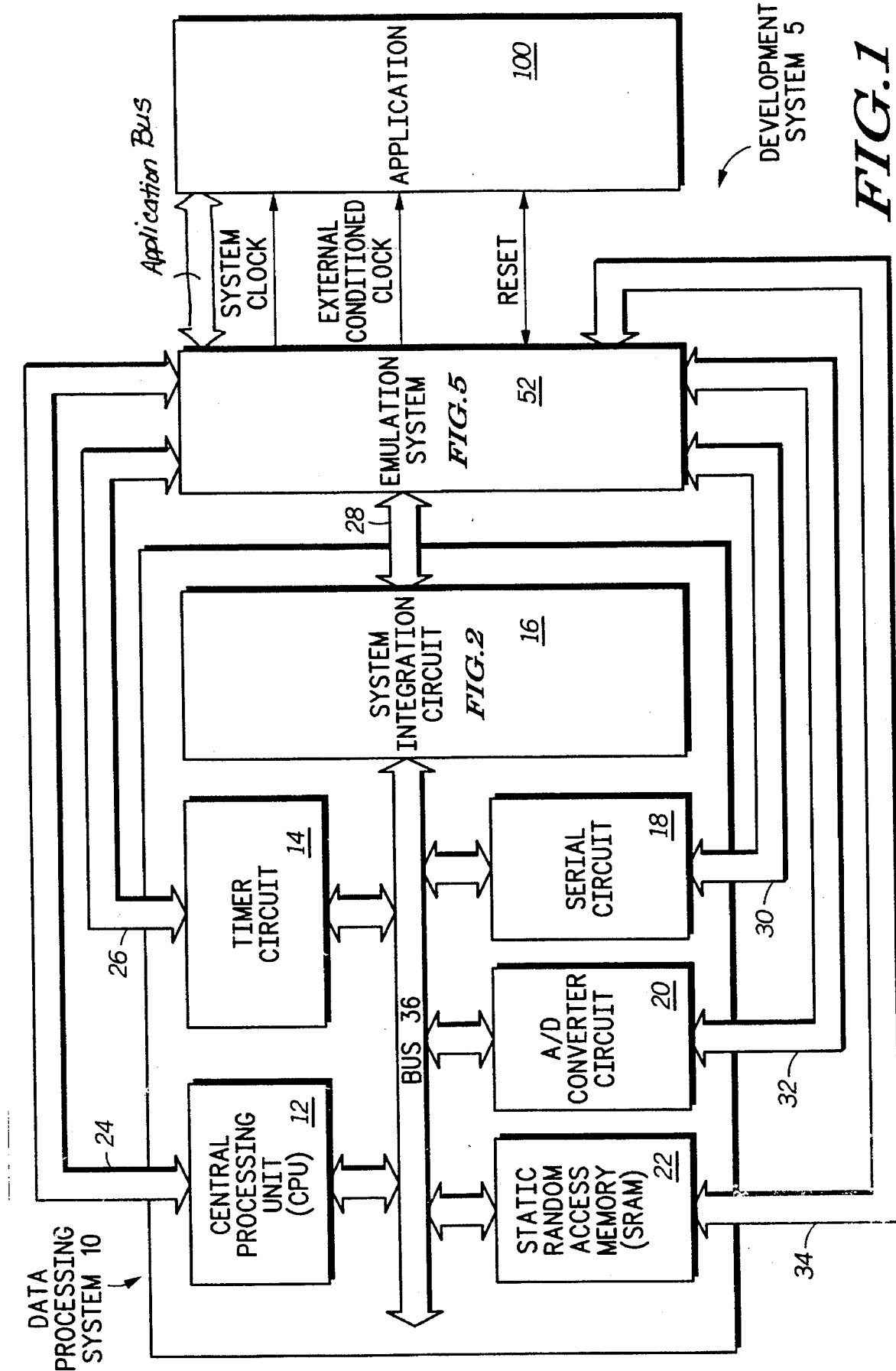
FIG. 1 illustrates in block diagram form a development system in accordance with the present invention.

A microcontroller can typically be described as a computer system on a silicon microchip. The microcontroller includes a central processing unit (CPU), memory, and various peripherals such as communications modules, timing modules, analog-to-digital converters, and other necessary modules. The microcontroller may be operated in an expanded or emulation mode, in which an on-chip computer system is visible to an external device. For example, in a normal mode of operation, some external resources, such as memory, will reside external to the microcontroller and will be accessible via external bus terminals. As well, in a single chip mode of operation, all of the accessed resources reside within the microcontroller. In the single chip mode of operation, no external memory is required. Therefore, the external bus terminals which communicate address, data, and control information in normal mode may be used for alternate functions such as input and output ports. Additionally, in an emulation mode of operation, the internal activity of the microcontroller is provided externally for emulation purposes.

Microcontrollers are also often operated in a single chip mode of operation, in which most, if not all, of the internal signals associated with the on-chip computer system are not visible to the external device. In the single chip mode of operation, the microcontroller includes all resources required for a complete computer system on a single integrated circuit chip and requires no information from external device. When in a single mode of operation, the pins associated with an expanded mode operation function as input/output communication ports, as well as various other functions. In an emulation mode, the development system actually operates the microcontroller in an expanded mode of operation to preserve external visibility of the microcontroller's internal operations. For the application, the combination of the microcontroller and the emulated system appears as if the microcontroller was operating in the single chip mode. Because multiplexed integrated circuit pins provide emulation data to the development system, the development system must replace the single chip mode functions of the pins via various circuits which emulate operation of various functions of the microcontroller. To an application, the development system appears to be a microcontroller operating in single chip mode. However, the development system is able to provide full visibility of the microcontroller's internal computer system.

As previously described, it is difficult to provide a clock signal reflecting an internal clock from a microcontroller to a development or emulation system when the clock signal is provided on an integrated circuit pin which communicates multiplexed data. External circuitry must be provided within the development system to synthesize the clock signal and to allow the remaining signal which was part of the multiplexed data to be output on the pin without interference. Therefore, a mechanism which synchronizes the synthesized signal generated by the development system with the actual signal used by the microcontroller must be provided. The synchronization step is especially problematic for signals which are not normally made available to external devices. In addition to the challenge of synchronizing the synthesized signal, designers of development systems are also faced with the possibility that the characteristic of the signal within the microcontroller may be modified. If the modification is not externally visible because the microcontroller does not provide the signal externally, a faithful external reproduction by the development system may not be possible.

Figure 11:
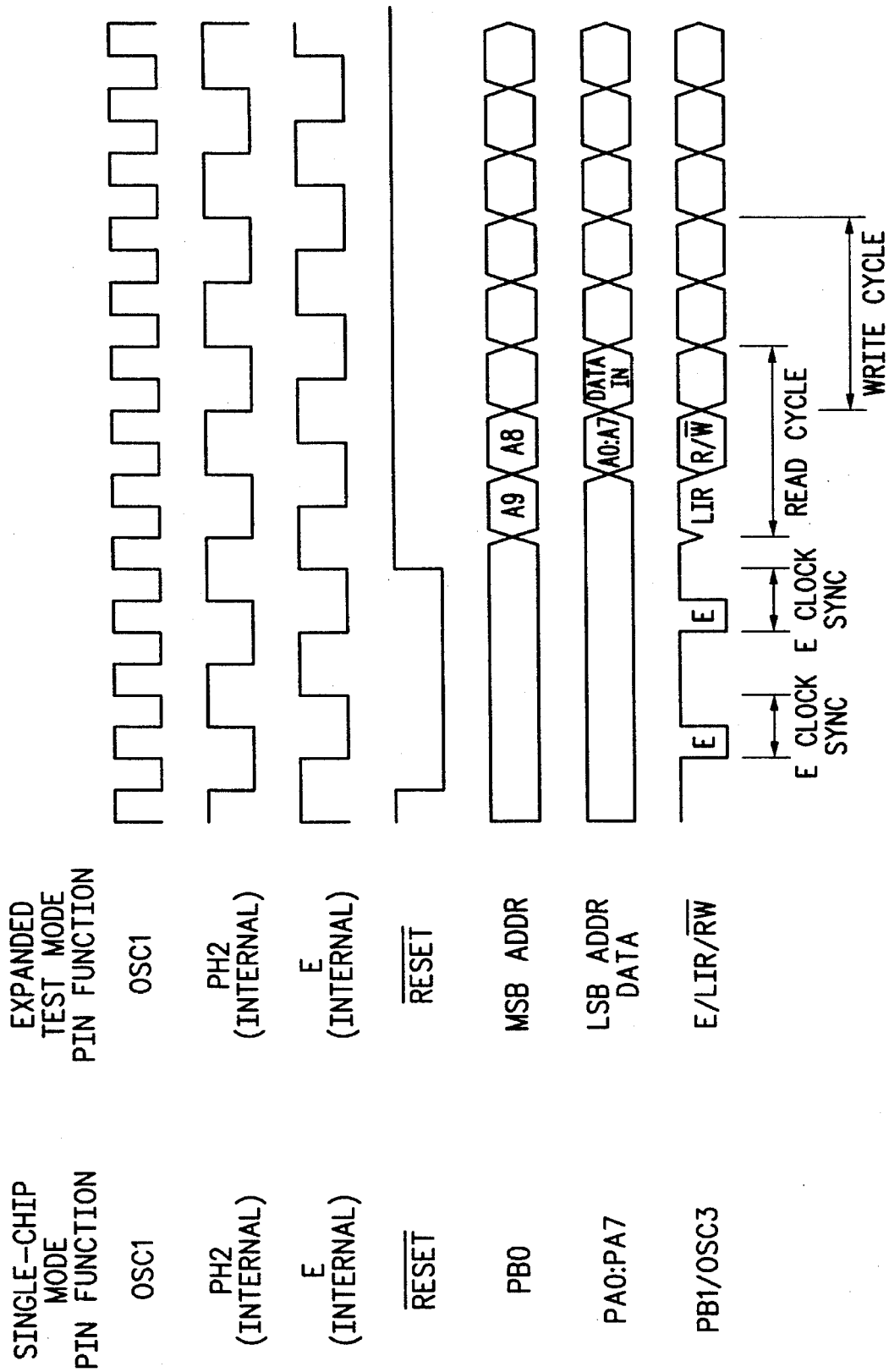
FIG. 11 illustrates in timing diagram form a plurality of signals provided to an emulation application during an emulation mode of operation in a prior art data processor.

Each of the challenges described above was encountered with various data processors used in development systems. In a prior art data processor, whose timing is illustrated in FIG. 11, an ECLOCK (clock) signal, a Read/Write(R/$\overline{\text{W}}$) function, and Load Instruction Register (LIR) function are all multiplexed for communication via a single external integrated circuit pin. The prior art microcontroller provides a unique solution in which a synchronization pulse is generated by a falling edge of the ECLOCK signal and provided to an external emulation system during a reset operation when the microcontroller is operating in a predetermined mode of operation. The synchronization pulse indicates only the falling edges of the ECLOCK signal and does not indicate the actual ECLOCK signal itself. When the reset operation is not executed, the ECLOCK signal is not provided to the external system; rather, a pin which provides the ECLOCK signal provides the R/$\overline{\text{W}}$ and LIR functions. Therefore, the prior art microcontroller provides a solution for synchronizing a synthesized signal provided by an emulation system. However, if the characteristics of the synchronized signal are modified by the central processor of the microcontroller, the modification may not be accurately reflected by the emulation system because the pin provides signals other than the ECLOCK signal when reset is not asserted.

In the present embodiment of the invention, an integrated circuit terminal of a data processor is required to communicate multiplexed signals with an external device. During a reset operation in which a reset signal is asserted, a desired internal clock signal is driven to the integrated circuit terminal such that an external development system may use the internal clock signal to synchronize an emulation operation. The desired internal clock signal, and not simply an edge of the internal clock signal is provided. The prior art device illustrated in FIG. 11 provides only the falling edges of the internal clock signal and is limited to providing frequency information. In contrast, the invention disclosed in the present invention provides duty cycle, phase information, and frequency information because the internal clock signal, and not just an edge of a clock signal, is provided. It should be noted that the integrated circuit terminal should be one which is not required during execution of the reset operation and that upon negation of the reset signal, the integrated circuit terminal returns to its normal function of communicating the multiplexed signals. Additionally, upon the negation of the reset signal, the external development system synthesizes the internal clock signal for use during the emulation operation.

Furthermore, the present embodiment of the invention provides external visibility of a write operation to registers which control pertinent signal parameters via another one of the plurality of integrated circuit terminals when the data processor operates in an emulation mode. During emulation mode, the data processor provides external visibility of internal bus cycles via a show-cycle mechanism which provides internal address and data to the external bus terminals and results in unique behavior of the external bus control signals. Operations to effect applicable internal signal behavior are externally indicated via the show cycle mechanism. This external visibility allows the emulation system to make similar changes to corresponding signal parameters therein. Therefore, the development system is able to accurately synchronize an emulation operation even when signal parameters are modified during operation.

Description of Connectivity

FIG. 1 illustrates a development system 5. Development system 5 includes a data processing system 10, an emulation system 52, and an application 100. Data processing system 10 is coupled to emulation system 52 via a bus 28, a plurality of integrated circuit terminals 24, a plurality of integrated circuit terminals 26, a plurality of integrated circuit terminals 30, a plurality of integrated circuit terminals 32, and a plurality of integrated circuit terminals 34. Emulation system 52 is coupled to application 100 via a System Clock signal, an External Conditioned Clock signal, a Reset signal, and an Application bus. Application bus provides signals to application 100 such as those transferred via busses 24, 26, 30, 32, and 34. Although not shown herein, data processing system 10 may also provide a plurality of signals which are synchronized to the Conditioned Cock signal.

Data processing system 10 includes a central processing unit (CPU) 12, a timer circuit 14, a system integration circuit 16, a serial communications circuit 18, an analog to digital (A/D) converter 20, and a static random access memory (SRAM) 22. A System Clock signal is connected to system integration circuit 22, as well as other portions of data processing system 10 not illustrated herein and to the emulation system circuitry.

Figure 2:
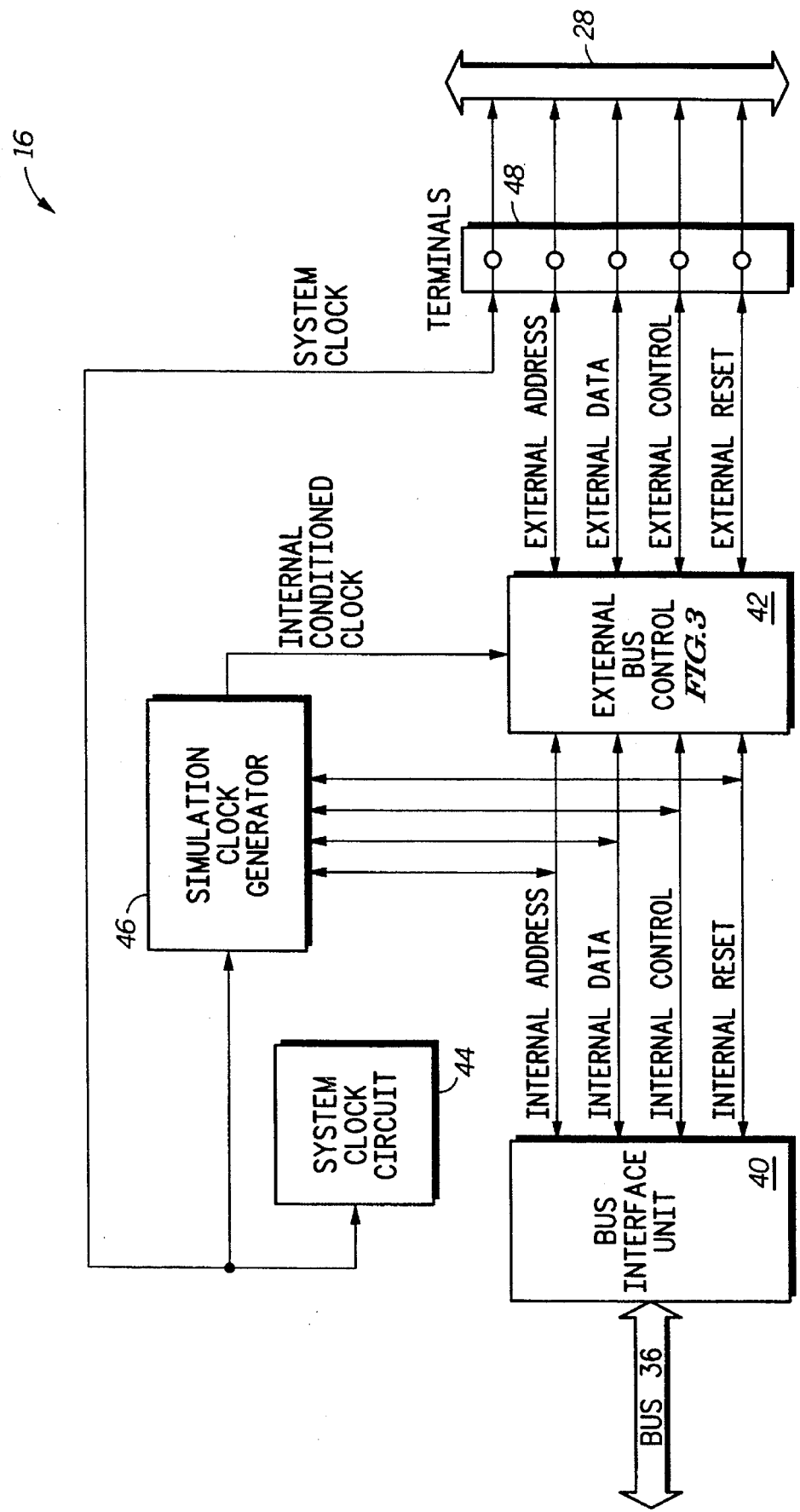
FIG. 2 illustrates in block diagram form a portion of a system integration circuit in a data processing system of the development system of FIG. 1.

FIG. 2 illustrates a portion of system integration circuit 16 of the data processing system 10 utilizing the present invention. System integration circuit 16 includes a bus interface unit 40, an external bus control 42, a system clock circuit 44, a simulation clock generator 46, and a plurality of bus terminals 48. Bus interface unit 40 of system integration circuit 16 is coupled to a remaining portion of data processing system 10 via bus 36. Bus interface unit 40 is coupled to both simulation clock generator 46 and external bus control 42 via an Internal Address bus, an Internal Data bus, an Internal Control bus, and an Internal Reset signal. System Clock circuit 44 provides a System Clock signal to simulation clock generator 46 and the plurality of terminals 48. Simulation clock generator 46 provides an Internal Conditioned Clock signal to external bus control 42. External bus control 42 is bidirectionally coupled to the plurality of bus terminals 48 via an External Address bus, an External Data bus, an External Control bus, and an External Reset signal. The plurality of bus terminals 48 are coupled to emulation system 52 via bus 28.

Figure 3:
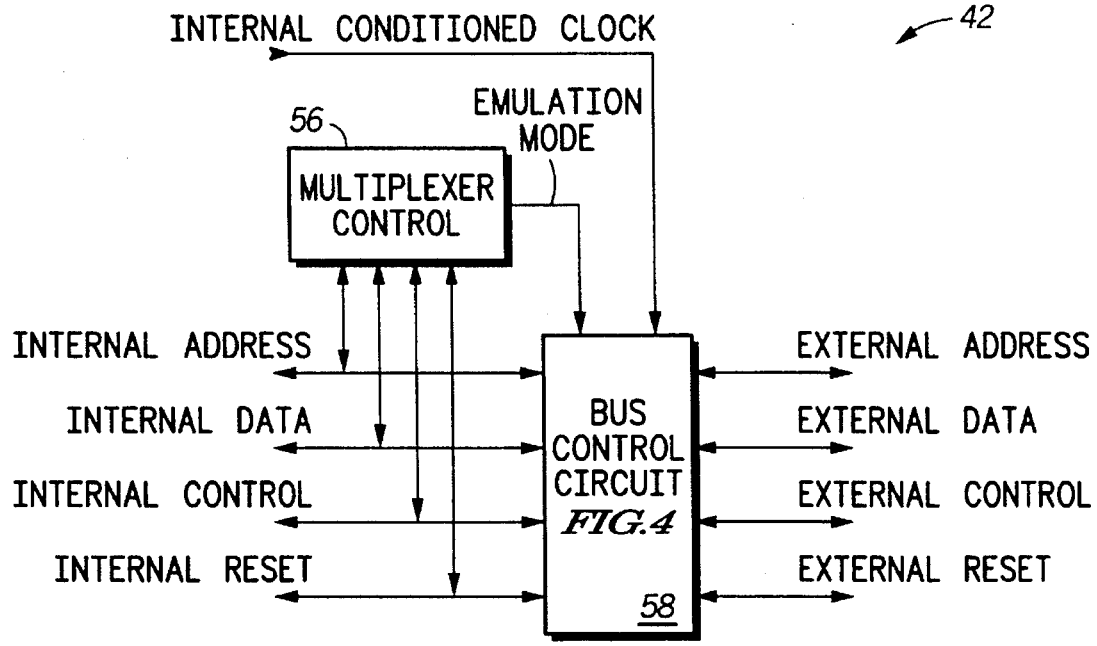
FIG. 3 illustrates in block diagram form a portion of an external bus interface circuit of the system integration circuit of FIG. 2.

External bus control 42 is illustrated in greater detail in FIG. 3. External bus control 42 includes a bus control circuit 58 and a multiplexer control circuit 56. The Internal Address bus, the Internal Data bus, the Internal Control bus, and the Internal Reset bus are provided to both multiplexer control circuit 56 and bus control circuit 58. The Internal Conditioned Clock signal is provided to bus control circuit 58. Multiplexer control circuit 56 is coupled to bus control circuit 58 via an Emulation Mode signal.

Figure 4:
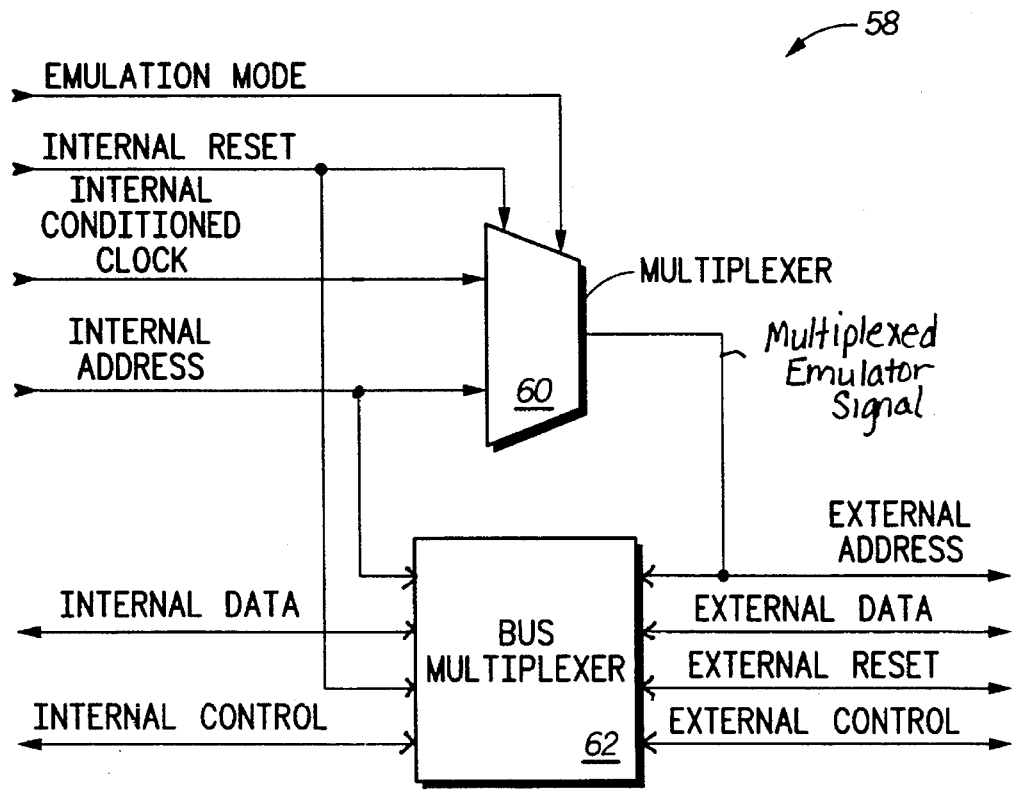
FIG. 4 illustrates in block diagram form a portion of a bus control circuit of the external bus interface circuit of FIG. 3.

Bus control circuit 58 is illustrated in greater detail in FIG. 4. Bus control circuit 58 includes a multiplexer 60 and a bus multiplexer 62. The Internal Data bus, the Internal Control bus, the Internal Reset signal, and the Internal Address bus are communicated with bus multiplexer 62. Bus multiplexer 62 communicates the External Address bus, the External Data bus, the External Reset signal, and the External Control signal. The Internal Address bus, the Internal Conditioned Clock signal, the Internal Reset signal, and the Emulation Mode signal are provided to multiplexer 60. Multiplexer 60 outputs a Multiplexed Emulator signal to the External Address signal. It should be understood that the Multiplexed Emulator signal may be provided singly or via another of the busses illustrated herein. The illustration of FIG. 4 is provided only as one example of possible implementations of the invention.

Figure 5:
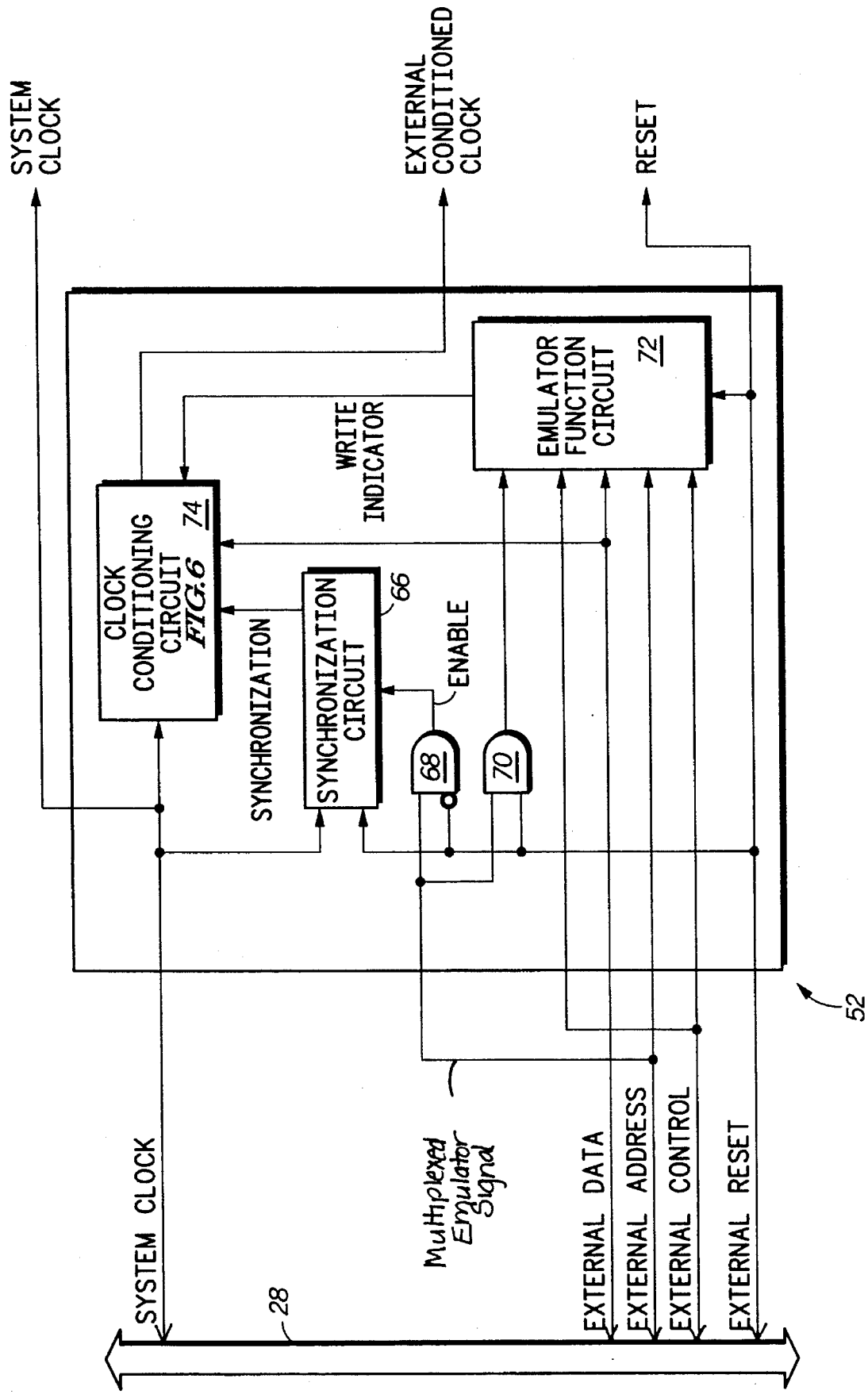
FIG. 5 illustrates in partial block diagram form a portion of an emulation system of the development system of FIG. 1.

Emulation system 52 is described in detail in FIG. 5. Emulation system 52 includes a clock conditioning circuit 74, a synchronization circuit 66, an AND gate 68, an AND gate 70, and an emulator function circuit 72. Bus 28 provides the System Clock signal, the External Data bus, the External Address bus, the External Control bus, and the External reset signal to emulation system 52. The External Reset bus is provided to a first input of emulator function circuit 72, a first input of AND gate 70, an inverted first input of AND gate 68, and a first input of synchronization circuit 66. The External Address bus is provided to a second input of emulator function circuit 72. The Cycle Type Indicator signal is provided by the External Control bus to a third input of emulation function circuit 72. The Write Indicator signal is provided by the emulator function circuit 72 to a first input of clock conditioning circuit 74. The System Clock signal is provided to a second input of the synchronization circuit 66, a second input of the clock conditioning circuit 74, and as an output of emulation system 52. The External Data bus is provided to a third input of emulator function circuit 72 and a third input of clock conditioning circuit 74. The External Control bus is provided to a fourth input of emulator function circuit 72. The Multiplexed Emulator signal is provided by the External Address bus to a second input of AND gate 70 and a second input of AND gate 68. An output of AND gate 70 is coupled to a fifth input of emulator function circuit 72. An output of AND gate 68, an Enable signal, is coupled to a third input of synchronization circuit 66. An output of synchronization circuit 66, a Synchronization signal, is coupled to a fourth input of clock conditioning circuit 74. An output of clock conditioning circuit 74 provides the External Conditioned Clock signal.

Figure 6:
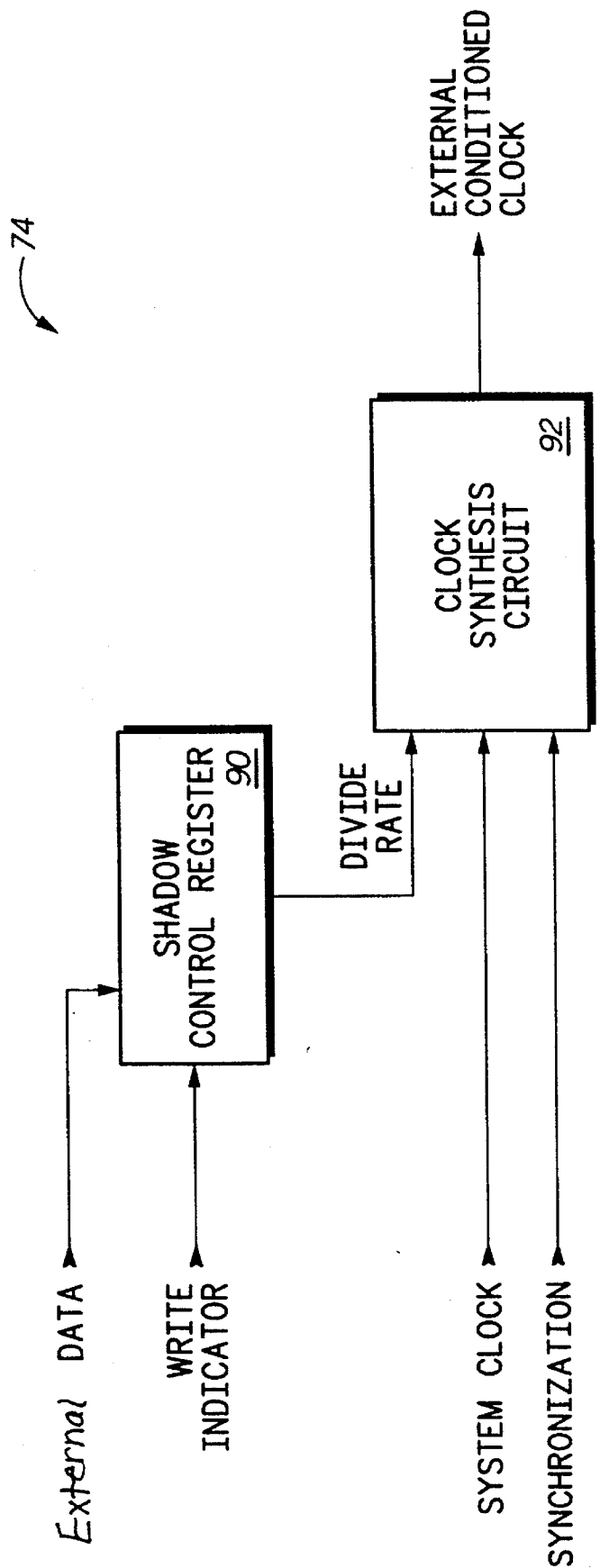
FIG. 6 illustrates in block diagram form a portion of a simulation clock generator of the system integration circuit of FIG. 2.

Clock conditioning circuit 74 is illustrated in greater detail in FIG. 6. Clock conditioning circuit 74 includes a shadow control register 90 and a clock synthesis circuit 92. The Write Indicator and the External Data bus are respectively provided to a first and a second input to shadow control register 90. Shadow control register 90 is connected to a first input of clock synthesis circuit 92 to provide a Divide Rate signal. The System Clock and Synchronization signals are respectively provided to a second and third input of clock synthesis circuit 92. Clock synthesis circuit 92 provides the Conditioned Clock signal.

Figure 12:
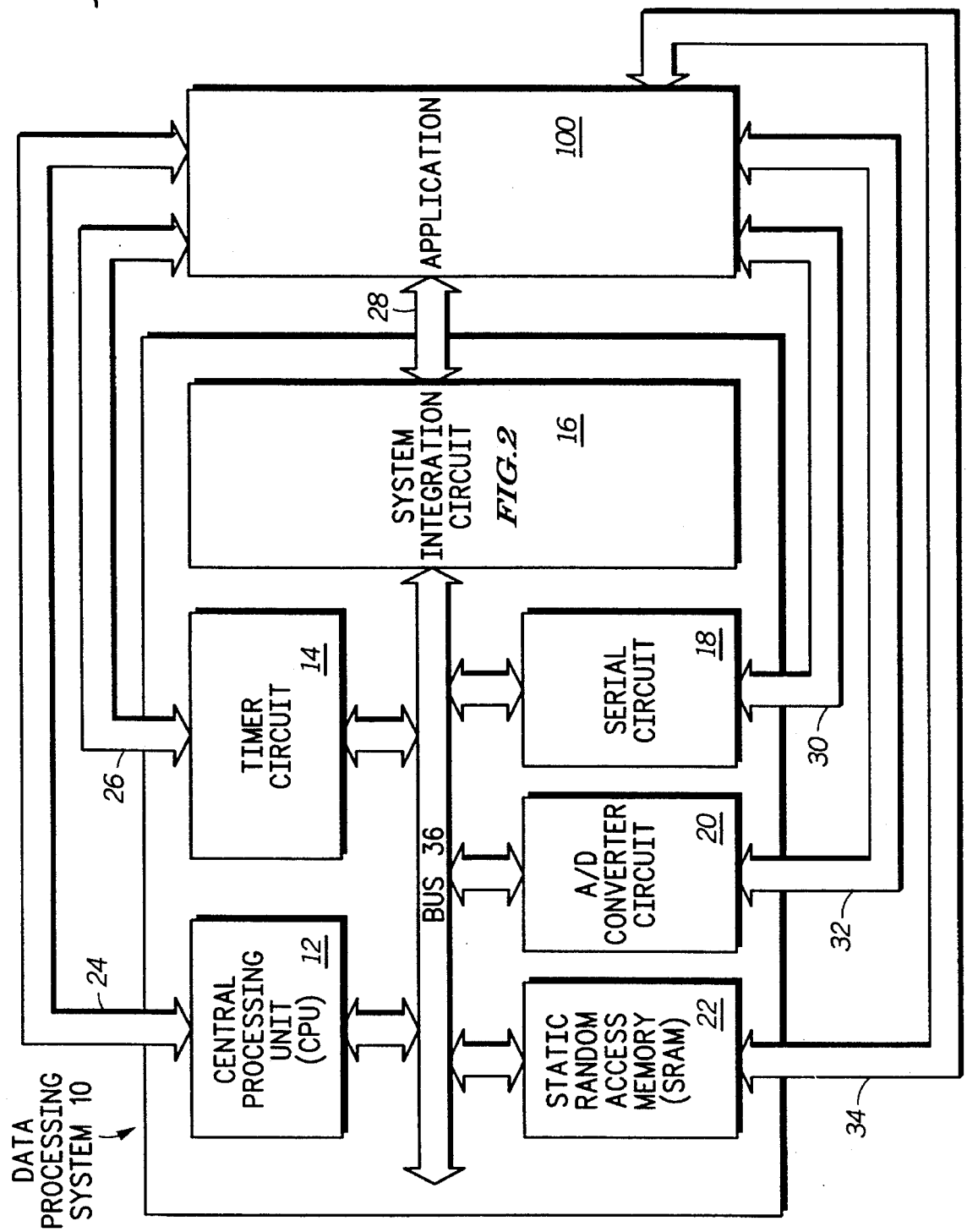
FIG. 12 illustrates in block diagram form a system in a normal mode of operation.

FIG. 12 illustrates a system 205 in a normal mode of operation. System 205 includes a data processing system 210 and an application 300. Data processing system 210 is coupled to application 300 via a bus 228, a plurality of integrated circuit terminals 224, a plurality of integrated circuit terminals 226, a plurality of integrated circuit terminals 230, a plurality of integrated circuit terminals 232, and a plurality of integrated circuit terminals 234. Although not shown herein, data processing system 210 may also provide a plurality of signals which are synchronized to the Conditioned Cock signal.

Data processing system 210 includes a central processing unit (CPU) 212, a timer circuit 214, a system integration circuit 216, a serial communications circuit 218, an analog to digital (A/D) converter 220, and a static random access memory (SRAM) 222. A System Clock signal is connected to system integration circuit 222, as well as other portions of data processing system 210 not illustrated herein and to the emulation system circuitry.

During a following description of the implementation of the invention, the terms "assert" and "negate," and various grammatical forms thereof, are used to avoid confusion when dealing with a mixture of "active high" and "active low" logic signals. "Assert" is used to refer to the rendering of a logic signal or register bit into its active, or logically true, state. "Negate" is used to refer to the rendering of a logic signal or register bit into its inactive, or logically false state. It should also be noted that a "$" preceding a value indicates that the value is hexadecimal. Additionally, microcontroller and data processing system are used interchangeably throughout the present specification.

Description of Operation

As previously mentioned, the present embodiment of the invention includes an integrated circuit terminal of a data processor which must communicate multiplexed signals with an external device. During a reset operation in which a reset signal is asserted, a desired internal clock signal is driven to the integrated circuit terminal such that an external development system may use the internal clock signal to synchronize an emulation operation. Generally, the integrated circuit terminal is one which is not required during execution of the reset operation. Furthermore, upon negation of the reset signal, the integrated circuit terminal returns to its normal function of communicating the multiplexed signal. Additionally, upon the negation of the reset signal, the external development system synthesizes the internal clock signal for use during the emulation operation.

The present embodiment of the invention also provides external visibility to the external emulation system to indicate a write operation to an internal register which controls pertinent signal parameters via another one of the plurality of integrated circuit terminals when the data processor operates in an emulation mode of operation. The external visibility of the write operation allows the emulation system to make similar changes to corresponding signal parameters generated therein. The development system is thus able to accurately synchronize an emulation operation even when signal parameters provided by the data processor are modified during operation. When modified internally, the emulated signal is simultaneously modified to provide an accurate synthesized signal to an external device.

Example of a System Environment of the Present Invention

Prior to describing the system in more detail, an example of a system environment will be described to provide background information about development systems which initiated the need for the present invention. It should be understood that this is but one embodiment of a development system or operating environment which may implement the invention disclosed in the present application.

In this example of a development system, assume the present invention is implemented in a data processor which includes an integrated circuit terminal for communicating a signal which transmits multiplexed data, address, and control information. Specifically, the integrated circuit terminal transfers multiplexed address, and clock information. For ease of understanding the remainder of this example, assume the address information, labeled Address[23], corresponds to bit twenty-three of an address bus, and the clock signal is an External Conditioned Clock signal which indicates the internal clock function of the data processor being emulated. It should be noted that the integrated circuit terminal communicating the address information is not required during a reset operation may be used for this purpose. It should be understood that any integrated circuit terminal not required during the reset operation may be used. Furthermore, the External Conditioned Clock signal in this example indicates an internal clock function of a data processor being emulated.

In this example as well as many applications, a user of a data processor desires the integrated circuit terminal to function as a clock (External Conditioned Clock). However, in a development environment, the development external system requires the data processor to provide bit twenty-three of the address (Address[23]) on the integrated circuit terminal. Address [23] is provided to support of external visibility of an internal address bus of the data processor while in emulation mode.

Due to the requirement that the integrated circuit terminal must provide Address [23] to the development system and also due to the requirement that development systems generally provide complete and transparent emulation of a data processor, the development system must reproduce the alternate function otherwise provided by the External Conditioned Clock signal. The external reconstruction of the Internal Conditioned Clock signal is complex and is made more difficult by the Internal Conditioned Clock signal's association with a chip select function generated by the data processor and emulated by the development system.

In essence, the data processor's chip select function may operate in a mode in which the chip select function must be synchronized to the External Conditioned Clock signal generated internally within the data processor. Because a properly synchronized combination of the External Conditioned Clock signal and bus control signals is usually required for most data processing applications, the development system's externally synthesized External Conditioned Clock signal must be synchronous with the Internal Conditioned Clock signal of the data processor. Synchronization between the Internal Conditioned Clock signal and its externally synthesized counterpart should then be achieved. The Internal Conditioned Clock signal synchronization problem is further compounded by the ability of a user's program to change a frequency or other parameter of the Internal Conditioned Clock signal. In one embodiment of the invention, the frequency is changed via a control bit in a clock control register.

A solution to the problem and challenges described above is provided by the present invention. The present embodiment of the invention describes:

1) Visibility of the Internal Conditioned Clock signal during a reset operation; and
2) Visibility of internal manipulation of the Internal Conditioned Clock signal during a non-reset operation.

In this example of the present embodiment of the invention, the integrated circuit terminal on to which External Conditioned Clock and Address[23] signals are multiplexed is assigned the function of providing the External Conditioned Clock signal when a reset signal is asserted and the data processor is being configured to operate in an emulator mode of operation. This state is primarily used by a development system to allow the development system to synchronize to the External Conditioned Clock signal for correct emulation operation. Synchronization of the development system to the data processor is required in order to synthesize a synchronized duplicate of the External Conditioned Clock signal to support bus cycles synchronized to the External Conditioned Clock signal and may be associated with any of the data processor's chip select signals.

Visibility and indication of writes to an internal clock control register of the microcontroller which may affect the frequency and other parameters of the Internal Conditioned Clock signal are provided externally. This is achieved via a mechanism which is referred to as a show-cycle and is a special external bus cycle used to provide visibility of internal bus cycles. This is required by the development tool in order to faithfully reproduce changes to the Internal Conditioned Clock signal via control of the externally synthesized External Conditioned Clock duplicate signal.

Emulation System Using Present Invention

A development system for the data processor incorporating the present invention places a data processor into an emulation mode of operation upon assertion of the data processor's reset signal. The data processor drives the address and data buses and bus control signals onto the input/output port integrated circuit terminals for communication to an emulation system. A development system 5 is illustrated in FIG. 1. As previously described, development system 5 includes a data processing system 10, emulation system 52, and application 100. Emulation system 52 of FIG. 1, receives address and data busses and bus control signals described above from data processing system 10 via bus 28. In the emulation mode of operation in one embodiment of the present invention, a portion of an upper address value is provided to emulation system 52 by a plurality of integrated circuit terminals included within bus 28. Additionally, the plurality of integrated circuit terminals which transfer information such as the address and clock information previously described. This information is externally visible and available to emulation system 52. Therefore, emulation system 52 is able to provide visibility of internal control signals of data processing system 10 being emulated by emulation system 52. Emulation of the integrated circuit terminal for communicating the Address[23] and External Conditioned Clock signals for various configurations of data processing system 10 will be subsequently described.

In the normal mode of operation, the External Conditioned Clock function is assigned to one of the plurality of integrated circuit terminals. In an emulation mode of operation, Address [23] is assigned to one of the plurality of integrated circuit terminals of data processing system 10 to be communicated with emulation system 52. Rather, an emulated signal provided by the emulation function circuit 72 of emulation system 52 is provided to application 100. An External Conditioned Clock synthesis mechanism (clock synthesis circuit 92 of FIG. 6) included within emulation system 52 provides a synthesized signal to application 100. This External Conditioned Clock synthesis mechanism is synchronized to an Internal Conditioned Clock signal while a reset signal is active and data processing system 10 is executing a reset operation. The External Conditioned Clock synthesis mechanism divides a system clock signal in the present embodiment of the invention. Since the user can change the divide rate of the internal signal freely, emulation system 52 utilizes a show cycle feature to observe write operations to an internal clock control register (control register 90 of FIG. 6) and to track a divide rate of the Internal Conditioned Clock signal. A show cycle is a mechanism which allows external visibility of internal operations of a data processor without interfering with the external activity of the data processor. Such features are well known in the data processing art and will not be discussed in further detail herein. By tracking the divide rate and making modifications to the externally synthesized External Conditioned Clock signal when appropriate, a correct synchronization between the Internal Conditioned Clock signal and the externally synthesized duplicate External Conditioned Clock signal is provided by emulation system 52.

Full non-intrusive emulation of a data processing system is considered essential by most users, especially in situations where time-to-market is a critical parameter. Other market constraints such as versatility, functionality, and cost all affect the design of a data processing system to a high degree. Without the present invention, the data processing system would require an extra integrated circuit terminal to support full emulation or the data processing system would not be capable of any support at all. Additionally, if the data processing system did not incorporate the present invention, the functionality of the data processing system would be reduced by eliminating support for the External Conditioned Clock signal, an action which could have an adverse impact on a key market for the data processing system. Clearly, the embodiment of the invention described herein provides an essential emulation "hook", as required for full emulation support. Furthermore, the present embodiment of the invention supports increased functionality in a reduced terminal count environment because the present invention alleviates the need for an independent External Conditioned Clock integrated circuit terminal which would be used only during an emulation operation.

Detailed Description of the Present Embodiment of the Invention

A general purpose application for emulating a data processing system will be subsequently discussed in greater detail. The data processing system includes a circuit which provides a clock signal and at least one data processing signal to be emulated which is generally synchronized with the clock signal. In other words, the clock signal and the data processing signal to be emulated have states which are interrelated in time and this relationship is required by the data processing system being emulated. A description of a normally operating application which establishes criteria for use of the present embodiment of the invention will be subsequently described.

Standard Mode of Operation

FIG. 1 illustrates a data processing system 10 which may operate in an emulation mode. In particular, emulation system 52 and application 100 enable data processing system 10 to execute emulation functions. Correspondingly, FIG. 12 provides a data processing system 10 which may operate in a normal mode of operation. When in the normal mode of operation, data processing system 10 may be connected directly to application 100 and does not require an intermediate emulation system, such as emulation system 52. In a normal mode of operation, application 100 receives the External Conditioned Clock signal and the System Clock signal from data processing system 10. A function of the External Conditioned Clock signal is derived from the System Clock signal. The External Conditioned Clock signal provides timing signals which allow application 100 to synchronize internal circuitry therein for communicating information with data processing system 10. The internal circuitry of data processing system 10 uses the Internal Conditioned Clock signal as an input to the circuitry generating the timing signals. Rather, application 100 uses the External Conditioned Clock signal in addition to the one or more phase coherent signals to synchronize its internal circuitry.

During operation, the Internal Conditioned Clock signal, the Internal Reset Signal, and one or more other data processor signals are provided to multiplexer 60 illustrated in FIG. 4. During a normal mode of operation, the Emulation Mode signal is negated and enables multiplexer 60 to provide the Internal Conditioned Clock signal to application 100 via the External Conditioned Clock signal. The External Conditioned Clock signal is then transferred to bus 28 via the External Address bus. Bus 28 is subsequently coupled to application 100. The Internal Conditioned Clock signal is transferred to the External Conditioned Clock signal during and after a reset operation. When transferred by the External Conditioned Clock signal, the Internal Conditioned Clock signal is used by application 100. It should be noted that by providing the Internal Conditioned Clock signal in this manner, any change to the Internal Conditioned Clock signal is directly communicated externally via the plurality of bus terminals 48 of FIG. 2. This feature is especially useful when the divide rate of the original clock signal is modified.

FIG. 7 illustrates a timing relationship between each of the input and output signals of development system 5 illustrated in FIG. 1 operating in a normal mode of operation. In the timing example illustrated in FIG. 7, the System Clock signal is divided by two to generate the Internal Conditioned Clock signal. Application 100 and the internal circuitry therein requires the synchronization of the Internal Conditioned Clock signal in relation to particular bus control signals in order to correctly process such signals during a normal mode of operation. Note that the signal indicating a mode of operation of data processing system 10, the Emulation Mode signal, remains in a negated state during the normal mode of operation. Note also that the Reset signal does not effect the behavior of the Multiplexed Emulator signal when the Internal Conditioned Clock signal is selected by multiplexer 60. Also, when the characteristic of the Internal Conditioned Clock changes, the External Conditioned Clock is directly modified and provided to application 100 (this is not shown herein).

Emulation Mode of Operation

FIG. 1 illustrates a development system 5. Development system 5 includes a data processing system 10 which is operating in an emulation mode of operation and emulation system 52. Data processing system 10 is coupled to an application 100 to provide data processor signals, some of which may be emulated by emulation system 52. When in the emulation mode of operation, data processing system 10 supports operation of emulation system 52. This support is exemplified by an integrated circuit terminal which multiplexes a clock signal with address and data signals which are communicated via bus 28. In this embodiment of the invention, assume the clock signal is the External Conditioned Clock signal and the address signal is the Address[23] signal. In the embodiment of the invention described herein, the integrated circuit terminal provides the Internal Conditioned Clock signal during a reset operation and provides the Address[23] signal in support of the emulation system during a nonreset operation.

When data processing system 10 is operating in the emulation mode of operation, emulation system 52 intercepts and monitors data processing signals communicated via bus 28. Emulation system 52 also emulates data processing signals typically generated by data processing system 10 in a normal mode of operation. Furthermore, when in an emulation mode of operation, data processing system 10 provides visibility of its own internal operations. Data processing system 10 must also replace some of the displaced functions to support an emulation mode of operation. An example of such a replaced function is the Internal Conditioned Clock signal. Data processing system 10 also generates bus control signals required by application 100 during the emulation mode of operation. The bus control signal is passed from data processing system 10 to application 100 through emulation system 52. However, because the Internal Conditioned Clock signal is not available after a reset operation is performed and the Reset signal is not active, emulation system 52 must provide an accurate replacement of the Internal Conditioned Clock signal. Emulation system 52 must provide a synthesized External Conditioned Clock signal to application 100 via the synthesized External Conditioned Clock signal such that the Internal Conditioned Clock signal used by bus control circuit 58 and the synthesized External Conditioned Clock signal are synchronized.

While synthesis of the Conditioned Clock signal is generated by emulation system 52 via clock conditioning circuit 74, an accurate synchronization between the Internal Conditioned Clock signal and the Conditioned Clock signal provided by emulation system 52 is established via synchronization circuit 66. Synchronization circuit 66 synchronizes the synthesized Conditioned Clock signal to the Internal Conditioned Clock signal when the Reset signal is active. It should be noted that clock conditioning circuit 74 is configured similar to an internal resource (not shown herein) of data processing system 10.

When the Reset signal is asserted, the multiplexed integrated circuit terminal communicating the Address[23]/Conditioned Clock signals provides only the Conditioned Clock signal. The Conditioned Clock is provided to synchronization circuit 66 of emulation system 52 illustrated in FIG. 5. AND gate 68 AND's an inverted Reset signal and the multiplexed Emulation Support Function/Internal Conditioned Clock signal to provide an Enable signal to synchronization circuit 66. When the Enable signal provided to synchronization circuit 66 is active, synchronization circuit 66 provides the Synchronization signal to clock conditioning circuit 74. Clock conditioning circuit 74 subsequently provides the Conditioned Clock signal which is synchronized to the Internal Conditioned Clock of data processing system 10 using the Synchronization signal, the System Clock signal, and a Divide Rate signal. The Divide Rate signal is determined by an address and data value respectively communicated via the Address and Data signals with shadow control register 90 of clock conditioning circuit 64. Clock synthesis circuit 92 subsequently uses the Divide Rate signal to insure the System Clock signal is divided in a manner similar to the Internal Conditioned Clock of data processing system 10.

Conversely, when the Reset signal is not active, the multiplexed integrated circuit terminal which provides the Conditioned Clock signal when the Reset signal is active, now communicates the Address[23] signal. The Emulation Support Function signal is provided to both AND gate 58 and emulator function circuit 72 of emulation system 52. Emulator function circuit 72 uses the Address[23] signal to provide full visibility of internal and external addresses to the user of the emulation system.

The waveforms illustrated in FIG. 8 illustrate the multiplexed Address[23]/Conditioned Clock signal communicated from data processing system 10 to emulation system 52 functioning as the Internal Conditioned Clock signal of data processing system 10 when the Reset signal is asserted. However, when the Reset signal is negated, the multiplexed Address[23]/Conditioned Clock signal communicated from data processing system 10 to emulation system 52 behaves distinctly different as the Address[23] signal, rather than the Conditioned Clock signal is communicated. Note, however, that the External Conditioned Clock is synchronized with the Internal Conditioned Clock signal even though the Internal Conditioned Clock signal is not externally available.

Modification of a Clock Rate During Operation in Emulation Mode

Data processing system 10 may modify the relationship between the Internal Conditioned Clock signal and the System Clock signal at any time during normal or emulation operation using a register (not shown) in simulation clock generator 46. Therefore, emulation system 52 must reliably track such changes to provide continued accuracy of the synthesized Conditioned Clock signal. Emulation system 52 provides a duplicate of the Conditioned Clock control register (shadow control register 90) as a component of the clock conditioning circuit 74. Shadow control register 90 is written each time the internal register (not shown herein) within data processing system 10 is written. Shadow control register 90 is also set to the same values as the internal register of simulation clock generator 46 during a reset operation such that both registers are initialized to the same value. Accurate performance of the function controlled by clock control register 90 and the internal register of data processing system 10 is dependent on the external visibility of write operations to data processing system 10's internal register.

Figure 9:
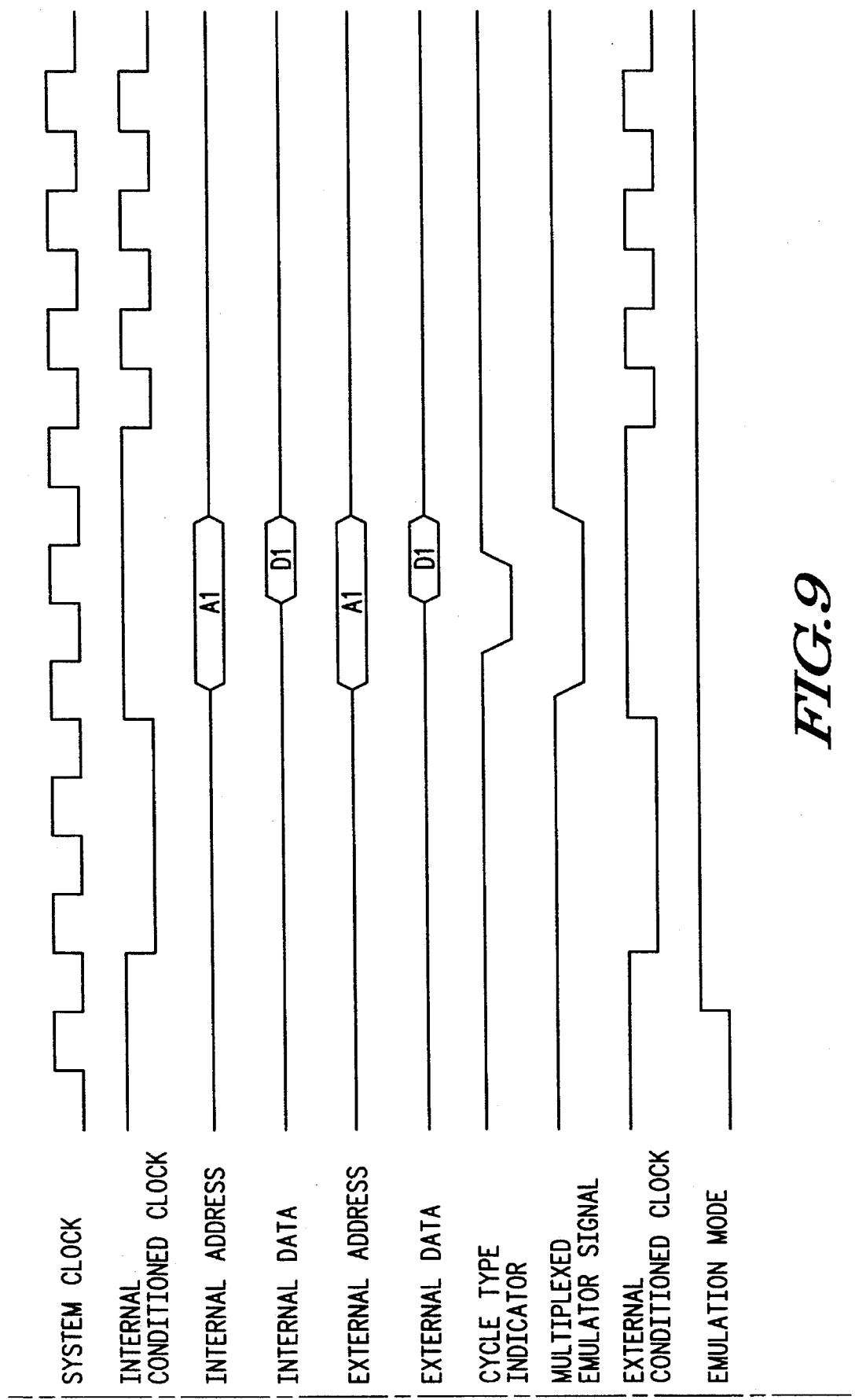
FIG. 9 illustrates in timing diagram indicating a plurality of signals generated by data processing system during the emulation mode of operation using a show cycle.

The circuit and method used to ensure the Conditioned Clock signal provided by emulation system 52 accurately reflects the internal Conditioned Clock signal of data processing system 10 uses the show cycle mechanism during the emulation operation. The show cycle mechanism is active when data processing system 10 is operating in an emulation mode of operation and when an internal bus operation is executed. FIG. 9 illustrates such an operation. An internal address typically provided by CPU 12 is decoded internally. When the address is provided externally using the show cycle mechanism, the address is decoded externally. When the address is decoded internally, data is written into a register (not shown) of simulation clock generator 46. When the register is modified, the Internal Conditioned Clock signal changes its rate as well. When the address is decoded externally by emulation system 52, a Write Indicator signal is generated by a combination of the externally decoded address and the Cycle Type Indicator signal. As a result, data is written to shadow control register 90 for altering the Divide Rate signal indicated in FIG. 6. Therefore, the External Conditioned Clock signal changes a rate which is communicated to application 100 simultaneously when the Internal Conditioned Clock signal is changed internally.

The decoded address is combined with the Cycle Type Indicator signal to determine when a valid operation is accessing internal resources. Whether for a read or write operation, the Cycle Type Indicator signal provides the internal data bus externally. In this case, the internal resource is the internal clock control register (not shown herein). Internal write operations to this register are reflected in the emulation system's shadow control register 90 by use of such address decoding in concert with the Cycle Type Indicator signal. FIG. 9 illustrates a change in the Internal Conditioned Clock signal caused by an internal bus cycle. The show cycle, indicated by the assertion of the Cycle Type Indicator signal provides the bus cycle information externally. Decoding of the corresponding address and identification of the show cycle cause the data to be written to the shadow control register 90, thus causing a corresponding change to the synthesized Conditioned Clock signal. Without this feature, the external synthesis circuitry would not be able to track the change to the internal Condition Clock signal and the external duplicate of the Internal Conditioned Clock signal, the Conditioned Clock signal, would lose proper synchronization to any phase related signals.

SUMMARY OF THE DETAILED DESCRIPTION

Figure 10:
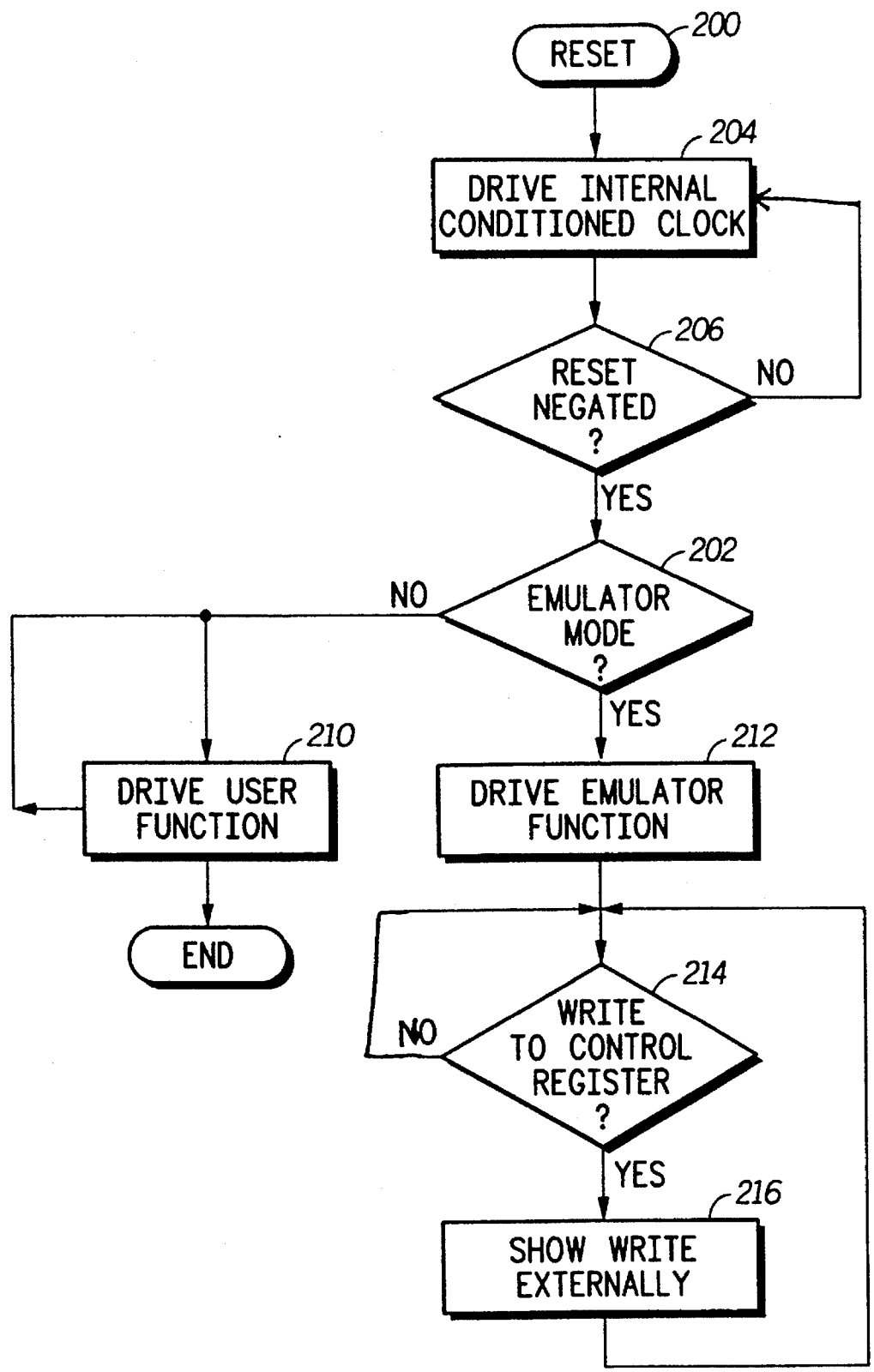
FIG. 10 illustrates in flow chart form a method for providing an internal signal to an external device in accordance with the present invention.

The flow chart of FIG. 10 provides a summary illustration of the methodology used by the present invention. Beginning with and during a reset operation, the mode of operation of data processing system 10 is configured. Subsequently, the Internal Conditioned Clock signal is driven out the multiplexed integrated circuit terminal for external synchronization (Step 204). The Reset signal is then tested to determine if it was negated (Step 206). If the Reset signal is not negated, a program flow is returned to Step 204 and the Internal Conditioned Clock signal is driven out the multiplexed integrated circuit terminal. Upon negation of the Reset signal, data processing system 10 is tested to determine if it is operating in an emulation mode of operation (Step 202). If data processing system 10 is not operating in the emulation mode of operation, Step 210 is executed and a user function is driven onto the multiplexed integrated circuit terminal. The program flow is then exited (END) until the Reset is asserted again and the program flow returns to Step 200. If data processing system 10 is operating in the emulation mode of operation, the Emulation Support Function signal is provided by the integrated circuit terminal providing the Emulator Function/Address[23] signals (step 212). Any write operation which modifies a register controlling a parameter of the Internal Conditioned Clock signal is indicated externally to allow emulation system 52 to have visibility and correctly synchronize to emulate the Internal Conditioned Clock signal (Step 214, Step 216). Data processing system 10 repeats steps 214 and 216 until the Reset signal is active, in which it restarts at step 200. It should be noted that the user function of Step 210 is the same as the Internal Conditioned Clock of Step 204 in this implementation of the invention.

Alternate Embodiments of the Present Invention

This present invention may be used to solve many problems involving the external synthesis and control tracking of an internal microprocessor signal which is not normally externally visible. This would not only apply to an environment in which a microprocessor application is under development, but could be used in the development of an on-chip microprocessor resource. Indeed, application of this concept could extend beyond a development environment into a general purpose, limited terminal count environment, where external duplication of an internal resource is more feasible than provision of external visibility of the resource by the microprocessor.

Furthermore, the implementation of the invention described herein is provided by way of example only. Many other implementations may exist for executing the function described herein. For example, the signal being emulated may be a clock or any other type of internal signal. Also, the gates illustrated in FIG. 5 may be implemented using other logic circuitry. The function of the signal being emulated may be multiplexed with any signal and not just an address signal.

While there have been described herein the principles of the invention, it is to be clearly understood to those skilled in the art that this description is made only by way of example and not as a limitation to the scope of the invention. Accordingly, it is intended, by the appended claims, to cover all modifications of the invention which fall within the true spirit and scope of the invention.

We claim:

1. A data processing system, comprising:
    bus interface means for communicating an address value, a data value, a control value and a reset signal;
    a system clock circuit for communicating a system clock signal;
    a simulation clock generator coupled to the system clock circuit for receiving the system clock signal, the simulation clock generator providing an internal conditioned clock signal in response to the system clock signal;
    mode control means for determining a mode of operation of the data processing system in response to the reset signal, the mode control means being coupled to the bus interface means for receiving reset signal, the mode control means providing a mode signal in a first logic state when the data processing system is operating in a first mode of operation and providing the mode signal in a second logic state when the data processing system is operating in a second mode of operation; and
    bus control means for providing a first information value when the data processing system is in the first mode of operation and for providing the internal conditioned clock signal when the data processing system is in the second mode of operation, the bus control means being coupled to the bus interface means for receiving the reset signal, being coupled to the mode control means for receiving the mode signal, and being coupled to the simulation clock generator for receiving the internal conditioned clock signal.

2. The data processing system of claim 1 wherein the internal conditioned clock signal is provided externally when the data processing system is in the second mode of operation and the reset signal is asserted.

3. The data processing system of claim 1 further comprising:
    a bus multiplexer for communicating an external address value, an external data value, an external control value, and an external reset signal, the bus multiplexer being coupled to the bus interface means for communicating an address value, a data value, a control value, and the reset signal, the bus multiplexer being coupled to the bus control means for receiving the first information value when the data processing system is in the first mode of operation and for providing the internal conditioned clock signal when the data processing system is in the second mode of operation and the reset signal is asserted.

4. The data processing system of claim 3 further comprising:
    a plurality of integrated circuit terminals coupled to the bus multiplexer for communicating the external address value, the external data value, the external control value, the reset signal, and the system clock signal, the plurality of integrated circuit terminals communicating the first information value when the data processing system is in the first mode of operation and communicating the internal conditioned clock signal when the data processing system is in the second mode of operation and the reset signal is asserted.

5. The data processing system of claim 1 wherein the first information value is the address information value.

6. The data processing system of claim 1 wherein the first mode of operation is a normal mode of operation and the second mode of operation is an emulation mode of operation.

7. The data processing system of claim 1 wherein the internal conditioned clock signal is provided by the bus control means when the data processing system is in the second mode of operation and when the reset signal is in a first logic state.

8. A development system, comprising:
    a data processor, comprising:

bus interface means for communicating an address value, a data value, a control value and a reset signal;

a system clock circuit for communicating a system clock signal;

a simulation clock generator coupled to the system clock circuit for receiving the system clock signal, the simulation clock generator providing an internal conditioned clock signal in response to the system clock signal;

mode control means for determining a mode of operation of the data processor in response to the reset signal, the mode control means being coupled to the bus interface means for receiving reset signal, the mode control means providing a mode signal in a first logic state when the data processor is operating in a first mode of operation and providing the mode signal in a second logic state when the data processor is operating in a second mode of operation;

bus control means for providing a first information value when the data processor is in the first mode of operation and for providing the internal conditioned clock signal when the data processor is in the second mode of operation, the bus control means being coupled to the bus interface means for receiving the reset signal, being coupled to the mode control means for receiving the mode control signal, and being coupled to the simulation clock generator for receiving the internal conditioned clock signal;

a plurality of integrated circuit terminals coupled to the bus control means for communicating an external address value, an external data value, an external control value, the reset signal, and the system clock signal, the plurality of integrated circuit terminals communicating the first information value when the data processor is in the first mode of operation and communicating the internal conditioned clock signal when the data processor is in the second mode of operation and the reset signal is asserted; and a control register for storing a divide rate value, the divide rate value indicating a relation between the system clock signal and the internal conditioned clock signal, the control register being coupled to the bus interface means for receiving the address value, the data value, the control value, and the reset signal; and an emulation system, comprising:

a shadow control register for storing a copy of the control register, the shadow control register being coupled to a first portion of the plurality of integrated circuit terminals for receiving the external data value and the external control value, the shadow control register storing a shadow divide rate;

a synchronization circuit coupled to a second portion of the plurality of integrated circuit terminals for receiving the reset signal and the system clock signal, the synchronization circuit providing a synchronization signal;

an emulator function circuit coupled to the plurality of integrated circuit terminals for receiving the external data value, the external address value, the external control value, and the reset signal for providing a write indicator circuit to indicate the divide rate value stored in the control register has been modified; and a clock synthesis circuit coupled to the shadow control register for receiving the shadow divide rate, coupled to a second portion of the plurality of integrated circuit terminals for receiving the system clock signal, and coupled to the synchronization circuit for receiving the synchronization signal, the clock synthesis circuit providing an external conditioned clock signal which is substantially similar to the internal conditioned clock signal.

9. The data processor of claim 8 wherein one of the external data value, the external address value, and the external control value is replaced by the internal conditioned clock signal when the data processor is operating in the second mode of operation.

10. A method for providing an internal signal of a data processing system, comprising the steps of:

communicating a system clock signal in the data processing system using a system clock circuit;

driving the internal signal using a simulation generator, the simulation generator being coupled to the system clock circuit to receive the system clock signal;

receiving a reset signal from a reset means, the reset means selectively initializing the data processing system;

repeating a step of driving the internal signal using the simulation generator when the reset signal is in a first logic state;

determining if the data processing system is operating in a predetermined mode of operation when the reset signal is in a second logic state;

providing the internal signal via an integrated circuit terminal when the data processing system is operating in the predetermined mode of operation; and providing a first user function via the integrated circuit terminal when the data processing system is not operating in the predetermined mode of operation.

11. The method of claim 10 wherein the predetermined mode of operation is an emulation mode of operation.

12. The method of claim 10 further comprising the steps of:

determining when an internal register of the data processing system is written to modify a parameter of the internal signal; and providing an indicator signal via an integrated circuit terminal.

13. A method for providing an internal clock signal of a data processing system, comprising the steps of:

providing a bus interface means for communicating an address value, a data value, a control value and a reset signal;

communicating a system clock signal using a system clock circuit;

providing an internal conditioned clock signal in response to the system clock signal using a simulation clock generator, the simulation clock generator coupled to the system clock circuit for receiving the system clock signal;

determining a mode of operation of the data processing system in response to the reset signal using a mode control means, the mode control means being coupled to the bus interface means for receiving the address value, the data value, the control value, and the reset signal;

providing a mode signal in a first logic state when the data processing system is operating in a first mode of operation;

providing the mode signal in a second logic state when the data processing system is operating in a second mode of operation;

providing a first information value when the data processing system is in the first mode of operation using a bus control means, the bus control means being coupled to the bus interface means for receiving the address value, the data value, the control value, and the reset signal, being coupled to the mode control means for receiving the mode signal, and being coupled to the simulation clock generator for receiving the internal conditioned clock signal; and providing the internal conditioned clock signal when the data processing system is in the second mode of operation and the reset signal is asserted, the bus control means being coupled to the bus interface means for receiving the address value, the data value, the control value, and the reset signal, being coupled to the mode control means for receiving the mode signal, and being coupled to the simulation clock generator for receiving the internal conditioned clock signal.

14. The method of claim 13 wherein the internal conditioned clock signal is provided externally when the data processing system is in the second mode of operation and the reset signal is asserted.

15. The method of claim 13 further comprising the step of:

communicating an external address value, an external data value, an external control value, and an external reset signal using a bus multiplexer, the bus multiplexer being coupled to the bus interface means for receiving the address value, the data value, the control value, and the reset signal, the bus multiplexer being coupled to the bus control means for receiving the first information value when the data processing system is in the first mode of operation and for providing the internal conditioned clock signal when the data processing system is in the second mode of operation and the reset signal is asserted.

16. The method of claim 15 further comprising the steps of:

communicating the external address value, the external data value, the external control value, the reset signal, and the system clock signal using a plurality of integrated circuit terminals;

communicating the first information value using the plurality of integrated circuit terminals when the data processing system is in the first mode of operation; and communicating the internal conditioned clock signal using the plurality of integrated circuit terminals when the data processing system is in the second mode of operation and reset signal is asserted.

17. The method of claim 16 further comprising the steps of:

storing a divide rate value in a control register, the divide rate value indicating a relation between the system clock signal and the internal conditioned clock signal, the control register being coupled to the bus interface means for receiving the address value, the data value, the control value, and the reset signal;

storing a copy of the control register in a shadow control register, the shadow control register being coupled to a first portion of the plurality of integrated circuit terminals for receiving the external data value and the external control value, the shadow control register storing a shadow divide rate;

coupling a synchronization circuit to a second portion of the plurality of integrated circuit terminals for receiving the external reset signal and the system clock signal, the synchronization circuit providing a synchronization signal;

coupling an emulator function circuit to the plurality of integrated circuit terminals for receiving the external data value, the external address value, the external control value, and the external reset signal for providing a write indicator circuit to indicate the divide rate value stored in the control register has been modified; and coupling a clock synthesis circuit to the shadow control register for receiving the shadow divide rate, to a second portion of the plurality of integrated circuit terminals for receiving the system clock signal, and to the synchronization circuit for receiving the synchronization signal, the clock synthesis circuit providing an external conditioned clock signal which is substantially similar to the internal conditioned clock signal.

18. The method of claim 17 wherein one of the external data value, the external address value, and the external control value is replaced by the internal conditioned clock signal when the data processing system is operating in the second mode of operation and the reset signal is asserted.

19. The method of claim 13 wherein the first information value is the address value.

20. The method of claim 13 wherein the first mode of operation is a normal mode of operation and the second mode of operation is an emulation mode of operation.

21. The method of claim 13 wherein the internal conditioned clock signal is provided by the bus control means when the data processing system is in the second mode of operation and when the reset signal is asserted.

22. A data processing system, comprising:

bus interface means for communicating a reset signal;

a system clock circuit for communicating a system clock signal;

a simulation clock generator coupled to the system clock circuit for receiving the system clock signal, the simulation clock generator providing an internal conditioned signal in response to the system clock signal;

mode control means for determining a mode of operation of the data processing system, the mode control means providing a mode signal in a first logic state when the data processing system is operating in a first mode of operation and providing the mode signal in a second logic state when the data processing system is operating in a second mode of operation; and bus control means for providing a first information value when the data processing system is in the first mode of operation and for providing the internal conditioned signal when the data processing system is in the second mode of operation and the reset signal is asserted, the bus control means being coupled to the bus interface means for receiving the reset signal, being coupled to the mode control means for receiving the mode signal, and being coupled to the simulation clock generator for receiving the internal conditioned signal.

* * * * *